United States Patent
Goodfellow et al.

(10) Patent No.: US 10,699,191 B2
(45) Date of Patent: Jun. 30, 2020

(54) GENERATING LARGER NEURAL NETWORKS

(71) Applicant: Google LLC, Mountain View, CA (US)

(72) Inventors: Ian Goodfellow, Brisbane, CA (US); Tianqi Chen, Seattle, WA (US); Jonathan Shlens, San Francisco, CA (US)

(73) Assignee: Google LLC, Mountain View, CA (US)

( * ) Notice: Subject to any disclaimer, the term of this patent is extended or adjusted under 35 U.S.C. 154(b) by 610 days.

(21) Appl. No.: 15/349,901

(22) Filed: Nov. 11, 2016

(65) Prior Publication Data

US 2017/0140272 A1 May 18, 2017

Related U.S. Application Data

(60) Provisional application No. 62/254,629, filed on Nov. 12, 2015.

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01); *G06N 3/0454* (2013.01)

(58) Field of Classification Search
CPC .......... G06N 3/08; G06N 3/04; G06N 3/0454; G06N 3/02; G06N 20/00; G06N 3/082
See application file for complete search history.

(56) References Cited

U.S. PATENT DOCUMENTS

| | | | | |
|---|---|---|---|---|
| 2009/0327195 A1* | 12/2009 | Iscen | ...................... | G06N 5/042 706/47 |
| 2014/0372112 A1* | 12/2014 | Xue | ........................ | G10L 15/16 704/232 |
| 2016/0155049 A1* | 6/2016 | Choi | ...................... | G06N 3/082 706/16 |

OTHER PUBLICATIONS

Ba et al. "Do deep nets really need to be deep?," Proceedings of the 28th Annual Conference on Neural Information Processing Systems, Dec. 8, 2014, 9 pages.
Chen et al., "Net2net: Accelerating learning via knowledge transfer." arXiv preprint arXiv:1511.05641, 2015, 6 pages.
DiMattina et al. "How to modify a neural network gradually without changing its input-output functionality," Neural Computation, vol. 22, No. 1, Dec. 11, 2009, 47 pages.
(Continued)

*Primary Examiner* — Vincent Gonzales
(74) *Attorney, Agent, or Firm* — Fish & Richardson P.C.

(57) ABSTRACT

This specification describes methods, systems, and apparatus, including computer programs encoded on a computer storage medium, for generating a larger neural network from a smaller neural network. One of the described methods includes obtaining data specifying an original neural network and generating a larger neural network from the original neural network The larger neural network has a larger neural network structure than the original neural network structure. The values of the parameters of the original neural network units and the additional neural network units are initialized so that the larger neural network generates the same outputs from the same inputs as the original neural network and the larger neural network is trained to determine trained values of the parameters of the original neural network units and the additional neural network units from the initialized values.

20 Claims, 3 Drawing Sheets

(56) References Cited

OTHER PUBLICATIONS

International Search Report and Written Opinion in International Application No. PCT/US2016/061704, dated Mar. 7, 2017, 15 pages.
Liu. "Incremental learning in deep neural networks," Thesis for Master in Information Technology at Tampere University of Technology, Sections 3 and 4, Jun. 2015, Retrieved from the Internet: URL<http://visions.cs.tut.fi/data/publications/liu_mscthesis_2015.pdf> [Retrieved on Feb. 22, 2017], 39 pages.
Parekh et al. "Constructive neural-network learning algorithms for pattern classification," IEEE Transactions on Neural Networks, vol. 11, No. 2, Mar. 2000, 16 pages.
Pratt et al. "A survey of transfer between connectionist networks," Connection Science, vol. 8, No. 2, 1996, 22 pages.
Romero et al. "FitNets: hints for thin deep nets," arXiv preprint arXiv 1412.6550v4, Mar. 27, 2015, 13 pages.

* cited by examiner

GENERATING LARGER NEURAL NETWORKS

CROSS-REFERENCE TO RELATED APPLICATIONS

This application claims the benefit under 35 U.S.C. § 119(e) of U.S. Patent Application No. 62/254,629, entitled "GENERATING LARGER NEURAL NETWORKS," filed Nov. 12, 2015. The disclosure of the foregoing application is incorporated herein by reference in its entirety for all purposes.

BACKGROUND

This specification relates to modifying neural network structures to generate better-performing neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods for generating a better-performing larger neural network from a smaller neural network that include the actions of obtaining data specifying an original neural network. The original neural network is configured to generate neural network outputs from neural network inputs, the original neural network having an original neural network structure comprising a plurality of original neural network units, each original neural network unit having respective parameters, and each of the parameters of each of the original neural network units having a respective original value. A larger neural network is generated from the original neural network, the larger neural network having a larger neural network structure comprising: (i) the plurality of original neural network units, and (ii) a plurality of additional neural network units not in the original neural network structure, each additional neural network unit having respective parameters. Values of the parameters of the original neural network units and the additional neural network units are initialized so that the larger neural network generates the same neural network outputs from the same neural network inputs as the original neural network. The larger neural network is trained to determine trained values of the parameters of the original neural network units and the additional neural network units from the initialized values.

The original neural network may be trained to determine the original values of the parameters of the original neural network.

The original neural network structure may comprise a first original neural network layer having a first number of original units. Generating the larger neural network may comprise adding a plurality of additional neural network units to the first original neural network layer to generate a larger neural network layer. Initializing values of the parameters of the original neural network units and the additional neural network units so that the larger neural network generates the same neural network outputs from the same neural network inputs as the original neural network may comprise initializing the values of the parameters of the original neural network units in the larger neural network layer to the respective original values for the parameters. For each additional neural network unit in the larger neural network layer: an original neural network unit in the original neural network layer may be selected, and the values of the parameters of the additional neural network unit may be initialized to be the same as the respective original values for the selected original neural network unit.

Selecting an original neural network unit in the larger neural network layer may comprises randomly selecting an original neural network unit from the original neural network units in the original neural network layer.

In the original neural network structure, a second original neural network layer may be configured to receive as input outputs generated by the first original neural network layer. In the larger neural network structure, the second original neural network layer may be configured to receive as input outputs generated by the larger neural network layer. Initializing values of the parameters of the original neural network units and the additional neural network units so that the larger neural network generates the same neural network outputs from the same neural network inputs as the original neural network may comprise initializing the values of the parameters of the original neural network units in the second original neural network layer so that, for a given neural network input, the second neural network layer generates the same output in both the original neural network structure and the larger neural network structure.

The original neural network structure may comprise a third original neural network layer configured to receive a third original layer input and generate a third original layer output from the third layer input. Generating the larger neural network may comprises replacing the third original neural network layer with a first additional neural network layer having additional neural network units and a second additional neural network layer having additional neural network units. The first additional neural network layer may be configured to receive the third original layer input and generate a first additional layer output from the third original layer input, and the second additional neural network layer may be configured to receive the first additional layer output and generate a second additional layer output from the first additional layer output.

Initializing values of the parameters of the original neural network units and the additional neural network units so that the larger neural network generates the same neural network outputs from the same neural network inputs as the original neural network may comprises initializing the values of the parameters of the additional neural network units in the first additional neural network layer and in the second additional neural network layer so that, for the same neural network input, the second additional layer output is the same as the third original layer output.

Initializing values of the parameters of the original neural network units and the additional neural network units so that the larger neural network generates the same neural network outputs from the same neural network inputs as the original neural network may comprises initializing the values of the parameters of the additional neural network units in the first additional neural network layer using the respective original values for the parameters of the original neural network units in the third original neural network layer.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. Knowledge contained in one neural network can be more rapidly transferred to another larger neural network. Larger neural networks that are designed based on an existing improved model can be created and trained faster. Parameter values obtained from training a smaller neural network can be used to expedite the training of larger neural networks. In situations in which the model underlying a neural network is an improvement on the model of a previously trained neural network, training of the improved model can be expedited. This enables more sophisticated neural networks to be trained through an iterative development process that reduces the amount of computing resources necessary to identify the structural changes necessary to generate a better-performing (e.g., more accurate) neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
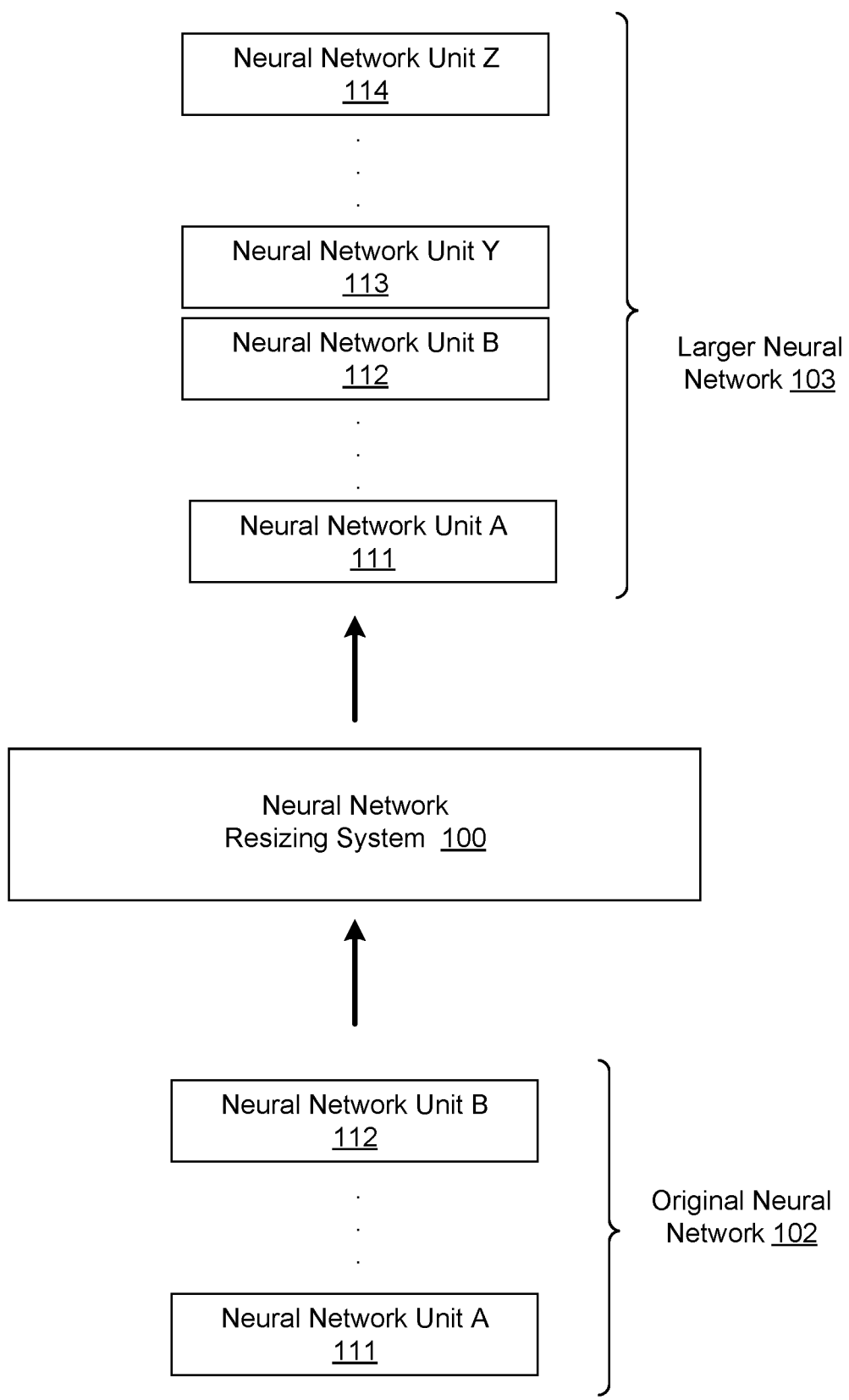
FIG. 1 shows an example neural network resizing system.

FIG. 1 shows an example neural network resizing system 100. The neural network resizing system 100 is an example of a system implemented as computer programs on one or more computers in one or more locations, in which the systems, components, and techniques described below can be implemented.

The neural network resizing system 100 is a system that receives data specifying an original neural network 102 and generates output data specifying a larger neural network 103.

The original neural network 102 and the larger neural network 103 are both configured to perform the same machine learning task.

The original neural network 102 and the larger neural network 103 are examples of neural networks and can be configured to perform any kind of machine learning task, i.e., to receive any kind of digital data input and to generate any kind of score, classification, or regression output based on the input.

For example, if the inputs to a neural network are images or features that have been extracted from images, the output generated by the neural network for a given image may be scores for each of a set of object categories, with each score representing an estimated likelihood that the image contains an image of an object belonging to the category.

As another example, if the inputs to a neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to a neural network are features of an impression context for a particular interactive content (such as content containing a hyperlink to other content), the output generated by the neural network may be a score that represents an estimated likelihood that the particular content will be clicked on or interacted with.

As another example, if the inputs to a neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to a neural network is text in one language, the output generated by the neural network may be a score for each of a set of pieces of text in another language, with each score representing an estimated likelihood that the piece of text in the other language is a proper translation of the input text into the other language.

As another example, if the input to a neural network is a spoken utterance, a sequence of spoken utterances, or features derived from one of the two, the output generated by the neural network may be a score for each of a set of pieces of text, each score representing an estimated likelihood that the piece of text is the correct transcript for the utterance or sequence of utterances.

The original neural network 102 includes neural network units, e.g., neural network unit A 111 and neural network unit B 112. Each neural network unit is configured to receive a unit input and generate a unit output from the input in accordance with a respective set of parameters.

The larger neural network 103 includes the neural network units of the original neural network 102, e.g., neural network unit A 111 and neural network unit B 112. The larger neural network 103 also includes additional neural network units, e.g., neural network unit Y 113 and neural network unit Z 114.

Generally, each neural network unit applies a set of parameters to the unit input and, in some cases, also applies an activation function, such as a step function or a sigmoid function, to the resulting output to generate the unit output.

The connections between neural network units may depend on the structure of neural networks. For instance, in a fully-connected neural network layer, a neural network unit in a neural network layer is connected to every neural network in the layer immediately preceding the neural network layer. In a convolutional neural network layer, some neural network units share parameters and are only connected to a subset of units in the preceding layer to allow the layer to perform functions such as processing and applying convolutions to a local region of input data.

The larger neural network 103 is larger than but functionally equivalent to the original neural network 102. A neural network α is larger than a neural network β if the neural network α has more neural network units than the neural network β. Two neural networks are functionally equivalent if, given the same inputs, they produce the same outputs.

Generating the larger neural network 103 from the original neural network 102 is described in more detail below with reference to FIGS. 2 and 3.

Once generated, the neural network resizing system 100 sets the initial value of parameters of the neural network units in the larger neural network 103, e.g., neural network unit A-D 111-114, so that the larger neural network 103 generates the same output as original neural network 102 for a given received input. Initializing values of parameters of the neural network units in the larger neural network 103 is described in further detail below with references to FIGS. 2-3.

The neural network resizing system 100 then trains the larger neural network 103. In particular, the neural network resizing system 100 updates the initial values of the parameters of the neural network units in the larger neural network 103 by training the larger neural network 103 on training data.

Figure 2:
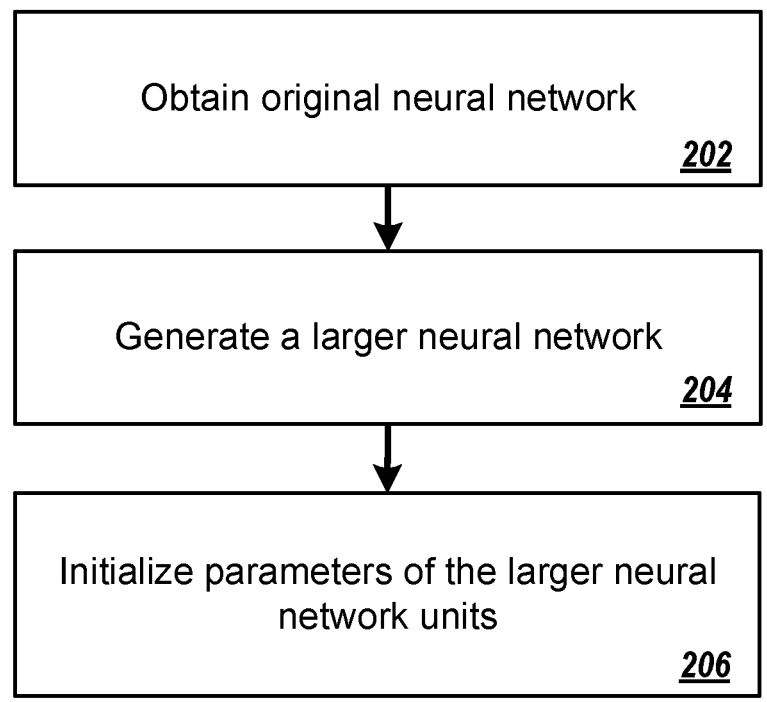
FIG. 2 is a flow chart of an example process for generating a larger neural network from a smaller neural network.

FIG. 2 is a flow chart of an example process 200 for generating a larger neural network from a smaller neural network. For convenience, the process 200 will be described as being performed by a system of one or more computers located in one or more locations. For example, a neural network resizing system, e.g., the neural network resizing system 100 of FIG. 1, appropriately programmed in accordance with this specification, can perform the process 200.

The system obtains data specifying an original neural network (202). The original neural network is configured to generate neural network outputs from neural network inputs. The original neural network has an original neural network structure. The original neural network structure includes multiple original neural network units. Each of the original neural network units has parameters, and each of the parameters has an original value.

In some implementations, the system trains the original neural network to determine the original values of the parameters of the original neural network from initial values of the parameters, e.g., using conventional neural network training techniques that are appropriate for the task that the original neural network is configured to perform.

The system generates a larger neural network from the original neural network (204). The larger neural network has a larger neural network structure. The larger neural network structure includes the original neural network units and additional neural network units not in the original neural network structure.

In some implementations, the system adds additional neural network units to a first original neural network layer of the original neural network structure to generate a lager neural network layer. In other words, the larger neural network layer is a neural network layer that includes all the units of the first neural network layer, but is larger than the original neural network layer because it also includes one or more additional units.

In some implementations, the system replaces a third original layer of the original neural network structure with a first additional neural network layer and a second neural network layer. In those implementations, the first additional neural network layer is configured to receive the input to the third original layer and generate a first additional layer output from that input. The second additional neural network layer is configured to receive the first additional layer output and generate a second additional layer output from the first additional layer output.

The system initializes the values of the parameters of the original neural network units and the additional neural network units (206) so that the larger neural network generates the same neural network outputs from the same neural network inputs as the original neural network. In other words, the system initializes the values of the parameters of the units of the larger neural network so that the larger neural network, despite its larger size, is functionally equivalent to the original neural network.

Initialization of the values of the parameters of the neural network units in implementations where the system added additional neural network units to generate a larger neural network is described in detail below with reference to FIG. 3.

In implementations in which the system replaces the third original layer with the first and second additional layers, the system initializes the values of the parameters of the neural network units in the first additional neural network layer and in the second additional neural network layer so that, for the same neural network input, the second additional layer output is the same as the output of the third original layer. In other words, the system initializes the values of the parameters of the units in the first and second additional neural network layers such that the combination of the first and second layers is functionally equivalent to the third original layer.

In some implementations in which the system replaces the third original layer with the first and second additional layers, the system initializes the values of the parameters of the additional neural network units in the first additional neural network layer using the original values for the parameters of the original neural network units in the third original neural network layer.

In some of those implementations, the system initializes the values of the parameters of the units in the second additional neural network layer so that input and output of the second additional neural network layer are equal. For instance, the system initializes the values of the parameters of the neural network units in the second additional neural network units in accordance with respective values of an identity matrix.

For instance, each unit of third original layer may implement the function $h^{(i)}$:

$$h^{(i)} = \phi(h^{(i-1)T} W^{(i)})$$

where $\phi$ is the activation function of the unit, $h^{(i-1)T}$ is the transpose of the input vector obtained from the layer preceding the third original layer, and $W^{(i)}$ is a vector of the parameters of the unit.

In some implementations, the system replaces the third original layer with two additional neural network layers. Each unit of an additional neural network layer is associated with a unit of the third original layer. The combined functionality of a pair of units of the two additional layers associated with the same unit of the third original layer can be described by the function $vh^{(i)}$, $$vh^{(i)} = \phi(U^{(i)T} \phi(W^{(i)T} h^{(i-1)}))$$

where $U^{(i)T}$ is the transpose of a vector of the parameters of a neural network unit in the second additional neural network layer.

The inner activation function (i.e., $\phi(W^{(i)T} h^{(i-1)})$) describes the functionality of each unit in the first additional neural network layer, while the outer activation function (i.e., $\phi(U^{(i)T}\phi(W^{(i)T}h^{(i-1)}))$) describes the functionality of each unit in the second additional neural network layer. $U^{(i)T}$ is a vector whose multiplication by $\phi(W^{(i)T}h^{(i-1)})$ is equal to the application of the activation function to $\phi(W^{(i)T}h^{(i-1)})$.

In some implementations, such as when the activation function $\phi$ is a rectified linear function, $U^{(i)T}$ is a slice (i.e., row or column) of an identity matrix. In other words, $U^{(i)T}$ is a vector with a "1" as one value and "0" as the other values. In those implementations, the result of the composition of $U^{(i)T}$ vectors for all the units of the second additional neural network will be an identity matrix.

In some implementations, such as when the activation function $\phi$ is a maxout function, $U^{(i)T}$ is a slice of a matrix similar to an identity matrix but with replicated columns.

The system trains the larger neural network to determine trained values of the parameters of the original neural network units and the additional neural network units from the initialized values (208). In other words, the system uses the initial values of the parameters of the units of the larger neural network as starting values for training the larger neural network.

Once trained, the system can process new inputs using the larger neural network in accordance with the trained values of the parameters of the larger neural network to perform the machine learning task, can store the trained values of the parameters for later use in instantiating a trained neural network that performs the machine learning task, or can transmit the trained values to another system for use in instantiating a trained neural network that performs the machine learning task.

Figure 3:
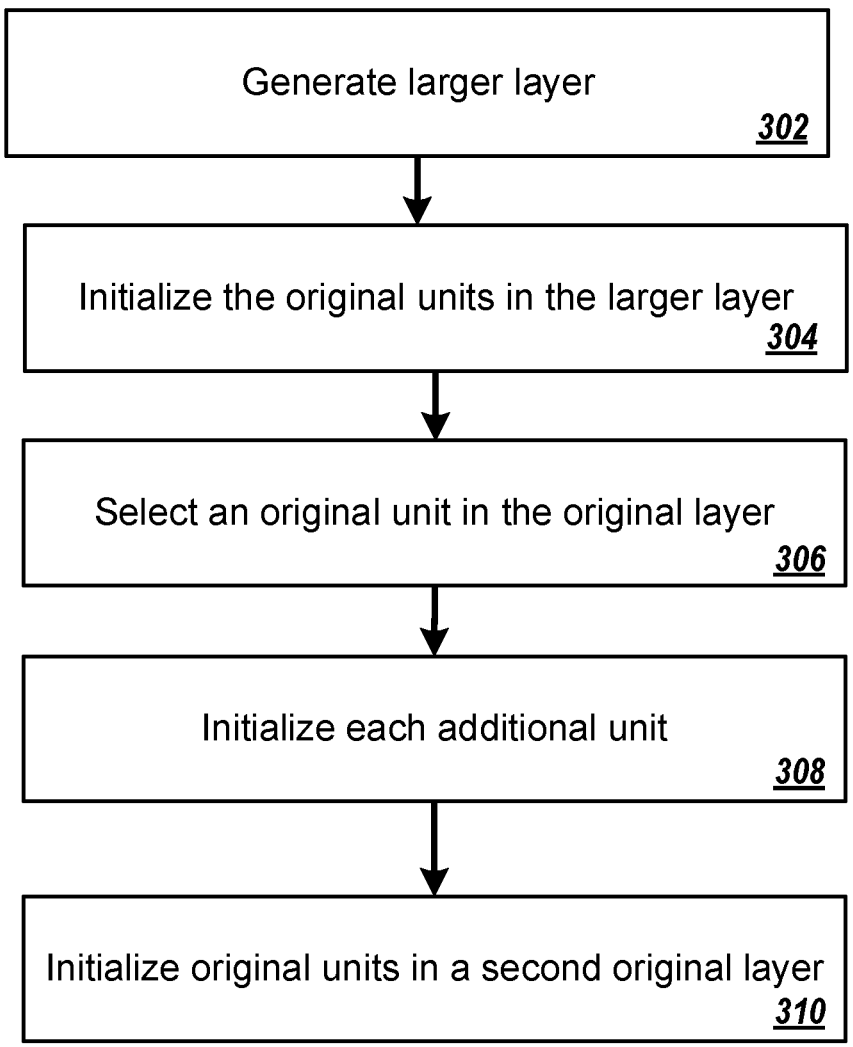
FIG. 3 is a flow chart of an example process for initializing the values of the parameters of a larger neural network layer.

FIG. 3 is a flow chart of an example process 300 for initializing the values of the parameters of a larger neural network layer. For convenience, the process 300 will be described as being performed by a system of one or more computers located in one or more locations. For example, a neural network resizing system, e.g., the neural network resizing system 100 of FIG. 1, appropriately programmed in accordance with this specification, can perform the process 200.

The system generates a larger neural network layer (302). The larger neural network layer includes the original neural network units of a first neural network unit layer and additional neural network units. Each of the original units has parameters, and each of the parameters has an original value.

The system initializes the values of the parameters of the original neural network units in the larger neural network layer to the original values for the parameters (302).

The system selects a respective original neural network unit for each additional neural network unit in the larger neural network layer (304).

In some implementations, the system randomly selects an original neural network unit from the original neural network units in the original neural network. In some of those implementations, the system randomly selects the original network unit from the original neural network units with replacement, so that each original neural network unit may potentially be selected many times.

The system initializes the values of the parameters of each additional network unit to be the same as the original values for the original neural network unit selected for the additional network unit (306).

In order to make the larger neural network functionally equivalent to the original neural network, the system modifies the values of a second original neural network layer that is configured to receive as input: (i) the output of a first original neural network layer in the original neural network structure; and (ii) the output of the larger neural network layer in the larger neural network structure.

The system can initialize the values of the parameters of the original neural network units in the second original neural network layer so that, for a given neural network input, the second neural network layer generates the same output in both the original neural network structure and in the larger neural network structure.

In some implementations, the system initializes the values of the parameters of the original neural network units in the second original neural network layer to values determined based on the values of the parameters of the neural network units in the first original neural network layer in the original neural network structure. For instance, suppose matrix $W^{(i)}$ represents the values of the parameters of the neural network units in the first original neural network layer in the original neural network structure, matrix $U^{(i)}$ represents the values of the parameters of the neural network units in the first original neural network layer in the larger neural network structure, and matrix $U^{(i+1)}$ represents the values of the parameters of the neural network units in the second original neural network layer in the larger neural network structure. Then, for all j, $$U_{j,:}^{(i+1)} = \frac{1}{c_{k_j}} W_{:,k_j}^{(i)}$$

where $K_j$ is the index of the column of $W^{(i)}$ that was copied to make column j of $U^{(i)}$ and $C_{k_j}$ is a count of the number of times column $K_j$ of $W^{(i)}$ was copied.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of generating a larger neural network from a smaller neural network, the method comprising:
    obtaining data specifying an original neural network, the original neural network being configured to generate neural network outputs from neural network inputs, the original neural network having an original neural network structure comprising a plurality of original neural network units, each original neural network unit having respective parameters, and each of the parameters of each of the original neural network units having a respective original value;
    generating a larger neural network from the original neural network, the larger neural network having a larger neural network structure comprising:
        (i) the plurality of original neural network units, and
        (ii) a plurality of additional neural network units not in the original neural network structure, each additional neural network unit having respective parameters;
    initializing values of the parameters of the original neural network units and the additional neural network units by setting the values of the parameters of the original neural network units and the additional neural network units to values that result in the larger neural network generating, for any particular neural network input, the same neural network output for the particular neural network input as would be generated by the original neural network by processing the particular neural network input in accordance with the original parameter values for the original neural network units; and
    training the larger neural network to determine trained values of the parameters of the original neural network units and the additional neural network units from the initialized values.

2. The method of claim 1, further comprising:
    training the original neural network to determine the original values of the parameters of the original neural network.

3. The method of claim 2, wherein the original neural network structure comprises a first original neural network layer having a first number of original units, and wherein generating the larger neural network comprises:
    adding a plurality of additional neural network units to the first original neural network layer to generate a larger neural network layer.

4. The method of claim 3, wherein initializing values of the parameters of the original neural network units and the additional neural network units so that the larger neural network generates the same neural network outputs from the same neural network inputs as the original neural network comprises:
    initializing the values of the parameters of the original neural network units in the larger neural network layer to the respective original values for the parameters; and for each additional neural network unit in the larger neural network layer:
        selecting an original neural network unit in the original neural network layer, and
        initializing the values of the parameters of the additional neural network unit to be the same as the respective original values for the selected original neural network unit.

5. The method of claim 4, wherein selecting an original neural network unit in the larger neural network layer comprises:
    randomly selecting an original neural network unit from the original neural network units in the original neural network layer.

6. The method of claim 4, wherein:
    in the original neural network structure, a second original neural network layer is configured to receive as input outputs generated by the first original neural network layer;
    in the larger neural network structure, the second original neural network layer is configured to receive as input outputs generated by the larger neural network layer; and
    initializing values of the parameters of the original neural network units and the additional neural network units so that the larger neural network generates the same neural network outputs from the same neural network inputs as the original neural network comprises:
        initializing the values of the parameters of the original neural network units in the second original neural network layer so that, for a given neural network input, the second neural network layer generates the same output in both the original neural network structure and the larger neural network structure.

7. The method of claim 6, wherein the original neural network structure comprises a third original neural network layer configured to receive a third original layer input and generate a third original layer output from the third layer input, and wherein generating the larger neural network comprises:
    replacing the third original neural network layer with a first additional neural network layer having additional neural network units and a second additional neural network layer having additional neural network units, wherein:
        the first additional neural network layer is configured to receive the third original layer input and generate a first additional layer output from the third original layer input, and
        the second additional neural network layer is configured to receive the first additional layer output and generate a second additional layer output from the first additional layer output.

8. The method of claim 7, wherein initializing values of the parameters of the original neural network units and the additional neural network units so that the larger neural network generates the same neural network outputs from the same neural network inputs as the original neural network comprises:
    initializing the values of the parameters of the additional neural network units in the first additional network layer and in the second additional neural network layer so that, for the same neural network input, the second additional layer output is the same as the third original layer output.

9. The method of claim 7, wherein initializing values of the parameters of the original neural network units and the additional neural network units so that the larger neural network generates the same neural network outputs from the same neural network inputs as the original neural network comprises:

initializing the values of the parameters of the additional neural network units in the first additional neural network layer using the respective original values for the parameters of the original neural network units in the third original neural network layer.

10. A system comprising one or more computers and one or more storage devices storing instructions that are operable, when executed by the one or more computers, to cause the one or more computers to perform operations comprising:

obtaining data specifying an original neural network, the original neural network being configured to generate neural network outputs from neural network inputs, the original neural network having an original neural network structure comprising a plurality of original neural network units, each original neural network unit having respective parameters, and each of the parameters of each of the original neural network units having a respective original value;

generating a larger neural network from the original neural network, the larger neural network having a larger neural network structure comprising:
      (i) the plurality of original neural network units, and
      (ii) a plurality of additional neural network units not in the original neural network structure, each additional neural network unit having respective parameters;

initializing values of the parameters of the original neural network units and the additional neural network units by setting the values of the parameters of the original neural network units and the additional neural network units to values that result in the larger neural network generating, for any particular neural network input, the same neural network output for the particular neural network input as would be generated by the original neural network by processing the particular neural network input in accordance with the original parameter values for the original neural network units; and training the larger neural network to determine trained values of the parameters of the original neural network units and the additional neural network units from the initialized values.

11. The system of claim 10, further comprising:
training the original neural network to determine the original values of the parameters of the original neural network.

12. The system of claim 11, wherein the original neural network structure comprises a first original neural network layer having a first number of original units, and wherein generating the larger neural network comprises:

adding a plurality of additional neural network units to the first original neural network layer to generate a larger neural network layer.

13. The system of claim 12, wherein initializing values of the parameters of the original neural network units and the additional neural network units so that the larger neural network generates the same neural network outputs from the same neural network inputs as the original neural network comprises:

initializing the values of the parameters of the original neural network units in the larger neural network layer to the respective original values for the parameters; and
    for each additional neural network unit in the larger neural network layer:

selecting an original neural network unit in the original neural network layer, and
      initializing the values of the parameters of the additional neural network unit to be the same as the respective original values for the selected original neural network unit.

14. The system of claim 13, wherein selecting an original neural network unit in the larger neural network layer comprises:

randomly selecting an original neural network unit from the original neural network units in the original neural network layer.

15. The system of claim 13, wherein:

in the original neural network structure, a second original neural network layer is configured to receive as input outputs generated by the first original neural network layer;

in the larger neural network structure, the second original neural network layer is configured to receive as input outputs generated by the larger neural network layer; and initializing values of the parameters of the original neural network units and the additional neural network units so that the larger neural network generates the same neural network outputs from the same neural network inputs as the original neural network comprises:

initializing the values of the parameters of the original neural network units in the second original neural network layer so that, for a given neural network input, the second neural network layer generates the same output in both the original neural network structure and the larger neural network structure.

16. The system of claim 15, wherein the original neural network structure comprises a third original neural network layer configured to receive a third original layer input and generate a third original layer output from the third layer input, and wherein generating the larger neural network comprises replacing the third original neural network layer with a first additional neural network layer having additional neural network units and a second additional neural network layer having additional neural network units, wherein:

the first additional neural network layer is configured to receive the third original layer input and generate a first additional layer output from the third original layer input, and
      the second additional neural network layer is configured to receive the first additional layer output and generate a second additional layer output from the first additional layer output.

17. A non-transitory computer storage medium encoded with instructions that, when executed by one or more computers, cause the one or more computers to perform operations comprising:

obtaining data specifying an original neural network, the original neural network being configured to generate neural network outputs from neural network inputs, the original neural network having an original neural network structure comprising a plurality of original neural network units, each original neural network unit having respective parameters, and each of the parameters of each of the original neural network units having a respective original value;

generating a larger neural network from the original neural network, the larger neural network having a larger neural network structure comprising:

(i) the plurality of original neural network units, and (ii) a plurality of additional neural network units not in the original neural network structure, each additional neural network unit having respective parameters;

initializing values of the parameters of the original neural network units and the additional neural network units by setting the values of the parameters of the original neural network units and the additional neural network units to values that result in the larger neural network generating, for any particular neural network input, the same neural network output for the particular neural network input as would be generated by the original neural network by processing the particular neural network input in accordance with the original parameter values for the original neural network units; and training the larger neural network to determine trained values of the parameters of the original neural network units and the additional neural network units from the initialized values.

18. The computer storage medium of claim 17, further comprising:

training the original neural network to determine the original values of the parameters of the original neural network.

19. The computer storage medium of claim 18, wherein the original neural network structure comprises a first original neural network layer having a first number of original units, and wherein generating the larger neural network comprises:

adding a plurality of additional neural network units to the first original neural network layer to generate a larger neural network layer.

20. The computer storage medium of claim 19, wherein initializing values of the parameters of the original neural network units and the additional neural network units so that the larger neural network generates the same neural network outputs from the same neural network inputs as the original neural network comprises:

initializing the values of the parameters of the original neural network units in the larger neural network layer to the respective original values for the parameters; and for each additional neural network unit in the larger neural network layer:

selecting an original neural network unit in the original neural network layer, and initializing the values of the parameters of the additional neural network unit to be the same as the respective original values for the selected original neural network unit.

\* \* \* \* \*

UNITED STATES PATENT AND TRADEMARK OFFICE
CERTIFICATE OF CORRECTION

| | | |
|---|---|---|
| PATENT NO. | : 10,699,191 B2 | Page 1 of 1 |
| APPLICATION NO. | : 15/349901 | |
| DATED | : June 30, 2020 | |
| INVENTOR(S) | : Goodfellow et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 685 days.

Signed and Sealed this
Twentieth Day of December, 2022

*Katherine Kelly Vidal*

Katherine Kelly Vidal
*Director of the United States Patent and Trademark Office*